(12) United States Patent
Bendewald et al.

(10) Patent No.: US 9,434,255 B2
(45) Date of Patent: Sep. 6, 2016

(54) METHOD AND APPARATUS FOR VARYING A POSITION OF AT LEAST ONE COMPONENT OF AN INFOTAINMENT SYSTEM IN THE INTERIOR OF A VEHICLE

(71) Applicant: VOLKSWAGEN AG, Wolfsburg (DE)

(72) Inventors: Lennart Bendewald, Wolfsburg (DE); Linn Hackenberg, Wolfsburg (DE)

(73) Assignee: VOLKSWAGEN AG, Wolfsburg (DE)

( * ) Notice: Subject to any disclaimer, the term of this patent is extended or adjusted under 35 U.S.C. 154(b) by 0 days.

(21) Appl. No.: 14/618,236

(22) Filed: Feb. 10, 2015

(65) Prior Publication Data

US 2015/0224877 A1 Aug. 13, 2015

(30) Foreign Application Priority Data

Feb. 12, 2014 (DE) .......................... 10 2014 202 528

(51) Int. Cl.
*B60K 37/06* (2006.01)
*B60N 2/02* (2006.01)
*B62D 15/00* (2006.01)
*B62D 1/181* (2006.01)

(52) U.S. Cl.
CPC .................. *B60K 37/06* (2013.01); *B60N 2/02* (2013.01); *B62D 1/181* (2013.01); *B62D 15/00* (2013.01); *B60K 2350/1004* (2013.01)

(58) Field of Classification Search
CPC .......... B60K 37/06; B60K 2350/1004; B62D 1/181; B62D 15/00; B60N 2/02
See application file for complete search history.

(56) References Cited

U.S. PATENT DOCUMENTS

2015/0032322 A1\* 1/2015 Wimmer ................ B60K 35/00
701/23

FOREIGN PATENT DOCUMENTS

DE 102005003071 B3 4/2006
DE WO 2013117321 A1 \* 8/2013 ............. B60K 35/00
EP 1637387 A1 3/2006

\* cited by examiner

*Primary Examiner* — Yuen Wong
(74) *Attorney, Agent, or Firm* — Barnes & Thornburg LLP

(57) ABSTRACT

A method for altering a position of at least one component of an infotainment system in the interior of a vehicle. The method involves ascertaining whether the vehicle is in a first travel mode or a second travel mode, wherein the first travel mode involves the vehicle being driven by a person and/or the second travel mode involves the vehicle not being driven by a person. If the vehicle is in a second travel mode, a first vehicle component is moved from a first position to a third position in the interior of the vehicle and the component of the infotainment system is moved from a second position to a fourth position in the interior of the vehicle.

10 Claims, 6 Drawing Sheets

METHOD AND APPARATUS FOR VARYING A POSITION OF AT LEAST ONE COMPONENT OF AN INFOTAINMENT SYSTEM IN THE INTERIOR OF A VEHICLE

PRIORITY CLAIM

This patent application claims priority to German Patent Application No. 10 2014 202 528.1, filed 12 Feb. 2014, the disclosure of which is incorporated herein by reference in its entirety.

SUMMARY

Disclosed embodiments relate to a method and an apparatus for altering a position of at least one component of an infotainment system in the interior of a vehicle.

BACKGROUND

The operator control of vehicle functions by the driver while driving is rendered possible today particularly by means of multifunctional steering wheels. These have operator control elements, which means that the driver can operate the infotainment system without taking his attention from the traffic on the road, and particularly his hands from the steering wheel. In future, however, vehicles will be capable of undertaking transverse and longitudinal guidance independently under certain conditions. Constant monitoring of the vehicle driving by the driver is then no longer necessary. During the journey, the driver then has time to perform other activities. In this case, the display of expanded display contents on a display area of the infotainment system is possible without any problems. In a travel mode in which the vehicle is being driven automatically, additional functions cannot be operated using the multifunctional steering wheel. This is possible only by an additional operator control unit, which is usually arranged in the central console of the vehicle.

Disclosed embodiments provide a method and an apparatus of the type mentioned at the outset that can be used in a simple manner to allow convenient operator control of the infotainment system in a vehicle mode in which the driver is not driving the vehicle himself.

BRIEF DESCRIPTION OF THE DRAWINGS

The invention is explained below using exemplary embodiments with reference to the drawings.

DETAILED DESCRIPTION OF THE DISCLOSED EMBODIMENTS

Figure 1:
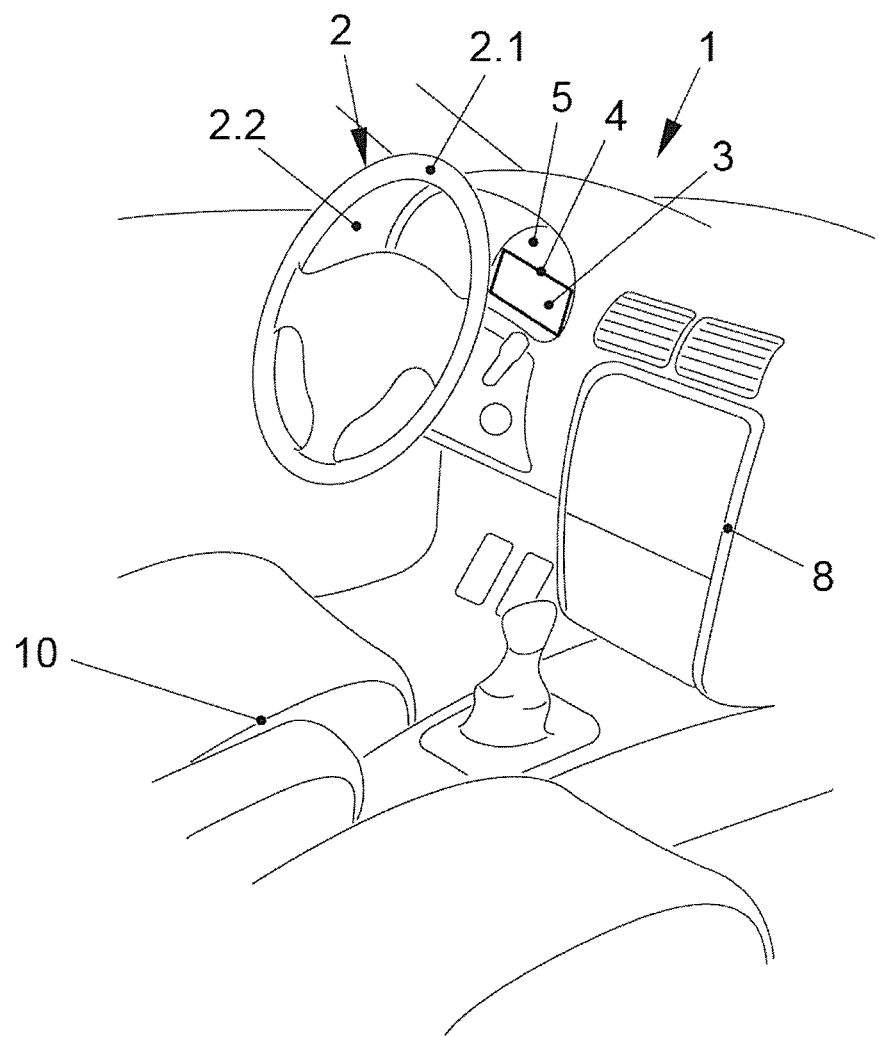
FIG. 1 shows an exemplary embodiment of the apparatus.
Figure 2:
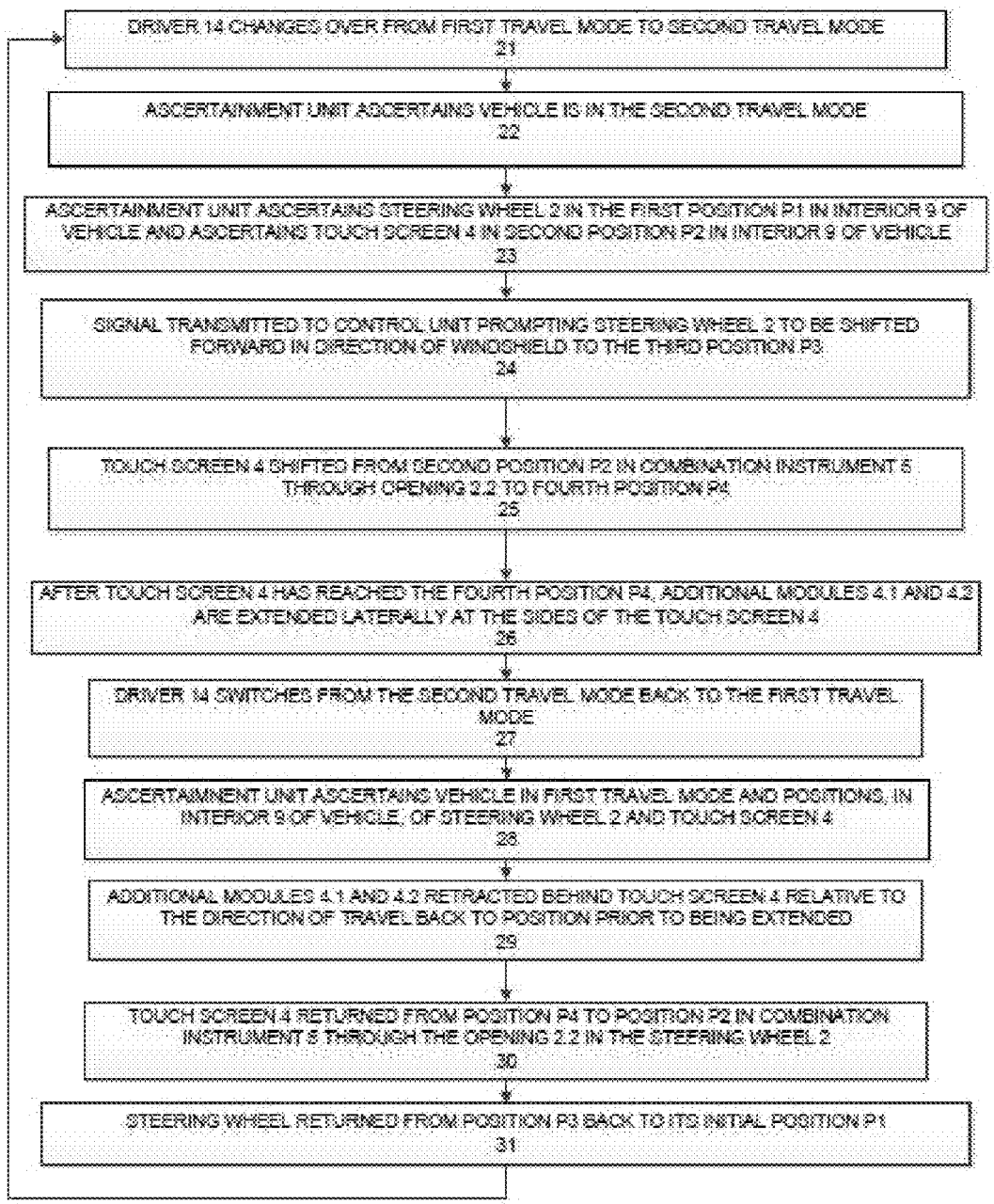
FIG. 2 shows a flowchart for a first exemplary embodiment of the method.

The disclosed method involves ascertaining whether the vehicle is in a first travel mode or a second travel mode, wherein the first travel mode involves the vehicle being driven by a person and/or the second travel mode involves the vehicle not being driven by a person. If it has been ascertained that the vehicle is in a second travel mode, a first vehicle component is moved from a first position to a third position in the interior of the vehicle and the component of the infotainment system is moved from a second position to a fourth position in the interior of the vehicle.

Since the position of the component of the infotainment system in the interior of the vehicle can be altered, the component can be shifted to any location in the interior of the vehicle on the basis of the travel mode. In this case, the first vehicle component may be a steering wheel, in particular. When the steering wheel is shifted, it is possible to create space between the driver and the component of the infotainment system. A reason is that particularly display units should adopt a certain interval from the driver to avoid overstraining the eyes of the driver. By contrast, an operator control unit should be arranged particularly within manual reach of the driver.

In particular, the method is initiated when an operator control intention by the driver is identified. The component of the infotainment system and the first vehicle component are thus initially at the second and first positions, respectively, in the interior of the vehicle. Only when an operator control intention is identified are the positions of the two components altered. In this case, the driver can indicate his operator control intention by bringing his hand closer to the component of the infotainment system. Alternatively, the driver can also indicate an operator control intention by operating a switch that is arranged in the interior of the vehicle specifically for this purpose.

In the first travel mode, the vehicle is driven manually by the driver himself. The second mode, in which the vehicle is not driven by a person or a driver, can correspond to a parking mode or an "automatic" mode. In the automatic mode, the vehicle can be driven by means of driver assistance systems, in particular.

In at least one disclosed embodiment of the method, the first vehicle component is a steering wheel. The steering wheel can be moved particularly to a rear position and to a front position relative to the direction of travel. In this case, the first position is the rear position and the third position is the front position. In addition, the component of the infotainment system is moved from the second position to the fourth position through an opening in the steering wheel. This means that the component of the infotainment system, in the first position of the steering wheel, is arranged in front of the steering wheel relative to the direction of travel. This disclosed embodiment involves the first vehicle component and the component of the infotainment system executing a contrary movement. In the first, rear position, the steering wheel adopts particularly a position in which the driver can reach the steering wheel with his arms to drive the vehicle. The rear position is thus adopted by the steering wheel particularly when the vehicle is operated in the first travel mode. When the vehicle is operated in the second travel mode, it is no longer necessary for the driver to be able to reach the steering wheel. Therefore, the steering wheel can then be positioned out of the reach of the driver, as is the case in the third, front position, for example.

In addition, this disclosed embodiment is advantageous particularly when the steering wheel is a multifunctional steering wheel having a plurality of operator control elements. A multifunctional steering wheel can usually be used to operate only basic functions of the vehicle. When the responsibility for vehicle driving changes to the vehicle, a display content on a display unit can usually be altered slightly. Operator control of additional contents of the infotainment system by the operator control elements on the multifunctional steering wheel then becomes difficult, however. By shifting particularly the operator control unit in front of the steering wheel relative to the line of vision of the driver, it is possible for the operator control elements of the multifunctional steering wheel to be replaced by extended operator control by the operator control unit, so that extended functions can also be operated.

In a further disclosed embodiment, a second vehicle component is moved from a fifth position to a sixth position in the interior of the vehicle when the vehicle is in the second travel mode. The direction of movement of the second vehicle component is ascertained. The direction of movement of the component of the infotainment system is then dependent on the direction of movement of the second vehicle component. In particular, the second vehicle component is a driver's seat that can be moved to a rear position and to a front position relative to the direction of travel. In this case, the fifth position is the front position and the sixth position is the rear position. The component of the infotainment system is tracked to the movement of the driver's seat until the fourth position and the sixth position adopt a predetermined interval from one another. The front position of the driver's seat is particularly a position in which the driver can reach the clutch, the gas pedal and the brake pedal with his feet. The front position is adopted by the seat in the first travel mode. In the second travel mode, on the other hand, it is not necessary for the driver to reach the pedals with his feet. In the second travel mode, the driver usually wishes to alter his seat position. Since the driver's seat is positioned further back relative to the direction of travel, the driver gains freedom of movement. This makes it easier for the driver to adopt a comfortable seat position. So as nevertheless to ensure an agreeable view of the display unit and that the operator control unit is positioned within manual reach, however, the display unit and/or operator control unit is/are tracked to the movement of the driver's seat. In this case, the preset interval can be chosen by each driver individually.

Disclosed embodiments relate to an apparatus for altering a position of at least one component of an infotainment system in the interior of a vehicle. The apparatus comprises a first vehicle component that can be moved from a first position to a third position in the interior of the vehicle. The apparatus additionally comprises an ascertainment unit that can be used to ascertain whether the vehicle is in a first travel mode or in a second travel mode, wherein the first travel mode involves the vehicle being driven by a person and/or the second travel mode involves the vehicle not being driven by a person. In addition, the apparatus comprises a movement unit that can be used to move the component of the infotainment system from a second position to a fourth position in the interior of the vehicle. Finally, the apparatus comprises a control unit that can be used to actuate the first vehicle component such that it is moved from the first position to the third position, and to actuate the movement unit such that it moves the component of the infotainment system from the second position to the fourth position. The apparatus is particularly suitable for carrying out the method and therefore has all the advantages of the method.

The movement unit particularly comprises an extendable and retractable aim on which the component of the infotainment system is arranged. The position of the component of the infotainment system can then be altered using simple mechanical means.

In particular, the component of the infotainment system is an operator control unit that, in the fourth position, is arranged behind the first vehicle component relative to the direction of travel, i.e. the component of the infotainment system, in the fourth position, is arranged in front of the first vehicle component relative to the line of vision of the driver. Preferably, the first vehicle component is a steering wheel of the vehicle that can be moved to a rear position and to a front position relative to the direction of travel. The first position is then the rear position and the third position is the front position.

In at least one disclosed embodiment of the apparatus, the component of the infotainment system, in the second position, is arranged in front of the steering wheel relative to the direction of travel. The steering wheel has an opening. The component of the infotainment system is embodied particularly such that it can be moved by means of the movement unit from the second position through the opening in the steering wheel to the fourth position. In the second position, the component of the infotainment system is arranged particularly in the combination instrument of the vehicle. In the fourth position, the component of the infotainment system is then arranged behind the steering wheel relative to the direction of travel. That is to say that the component of the infotainment system is arranged in front of the steering wheel from the line of vision of the driver. This particularly allows the component of the infotainment system to be shifted to a position that is arranged such that the driver can look straight at the display unit or operator control unit without having to turn his head to do so.

In particular, the component of the infotainment system is an operator control unit that is arranged as a touch-sensitive surface on a display unit of the infotainment system. The display unit is then thus what is known as a touch screen. This is advantageous particularly because no separate display units and operator control units then need to be installed in the vehicle. This allows installation space to be saved.

In another disclosed embodiment, the display area of the display unit and/or the touch-sensitive surface, in the fourth position, can be expanded by additional modules on at least one side. Since the extent of the display unit and/or of the operator control unit is limited by the size of the opening, the latter can advantageously be enlarged in this disclosed embodiment. The modules that expand the display area and/or the touch-sensitive surface may be modules that, in the second position, are stowed in front of the display unit relative to the direction of travel and, in the fourth position, can be extended laterally, upward and/or downward. Alternatively, they may be plug-on modules that the driver himself plugs on when needed.

Alternatively, they may be flexible modules that are "rollable" or "foldable" and are stowed in rolled-up form or folded form in the second position and are unrolled or unfolded in the fourth position.

With reference to FIGS. 1, 3, 4*a* to 4*c* and 6, an exemplary embodiment of an apparatus 1 and an arrangement of the apparatus 1 in a vehicle are explained.

The apparatus 1 comprises at least one component of an infotainment system. In this case, the component of the infotainment system is particularly an operator control unit 3. The operator control unit 3 is arranged as a touch-sensitive surface on a display unit 4, which is likewise part of the infotainment system. Accordingly, the display unit 4 is a touch screen. The text below refers to the touch screen with the reference symbol 4 as a component of the infotainment system. The touch screen 4 is arranged in the combination instrument 5 of the vehicle.

The apparatus 1 additionally comprises a steering wheel 2. The steering wheel 2 has a steering wheel ring 2.1 and an opening 2.2.

The steering wheel 2 can have its position adjusted to be able to be adjusted to suit the anatomies of different drivers. In this case, the steering wheel 2 can be in a front position and a rear position in the direction of travel, shown by the arrow 16 in FIGS. 3 and 6. The rear position P1 is a position in which the steering wheel 2 is adjusted by the driver 14 to drive the vehicle. To be put into the front position P3, the steering wheel 2 is thus shifted in the direction of the windshield of the vehicle.

The vehicle can be operated in at least two different travel modes. In this case, a first travel mode comprises "manual" driving of the vehicle. This means that a driver 14 drives the vehicle himself. In the second travel mode, the driver 14 does not drive the vehicle himself. This may thus be a parking mode or a mode in which the vehicle is driven "automatically". In the automatic travel mode, the vehicle is controlled automatically by means of driver assistance systems without the need for action by the driver 14.

The apparatus 1 additionally has an ascertainment unit (not shown) that can be used to ascertain which of the two travel modes the vehicle is currently being operated in.

In addition, the ascertainment unit can ascertain a first position P1 in the interior 9 of the vehicle, which position is occupied by the steering wheel 2. In this case, the first position P1 in the interior 9 of the vehicle is particularly the rear position, to which the steering wheel 2 is adjusted by the driver before the start of the journey. The first position can vary in this case depending on the anatomy of the driver 14. The ascertainment unit can also ascertain a second position P2 in the interior 9 of the vehicle, which position is occupied by the touch screen 4. In the present example, the touch screen 4, as already mentioned, is arranged in the combination instrument 5 of the vehicle in front of the steering wheel 2 relative to the direction of travel 16, i.e. behind the steering wheel 2 relative to the line of vision of the driver 14.

In addition, the apparatus 1 comprises a control unit (not shown). When a signal is transmitted by the ascertainment unit, the control unit can be used to actuate the steering wheel 2 and the touch screen 4 such that the positions that the steering wheel 2 and the touch screen 4 are in are altered.

Figure 4A:
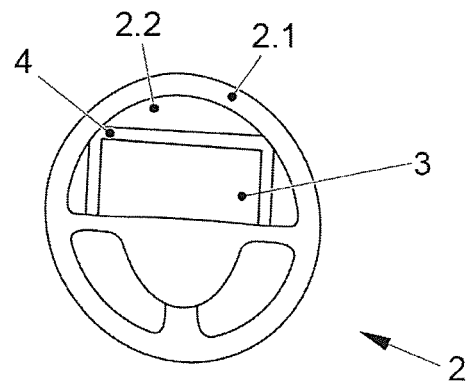
FIG. 4a shows an illustration of the different positions of the component of the infotainment system at the beginning of the first exemplary embodiment of the method from a front view.
Figure 4B:
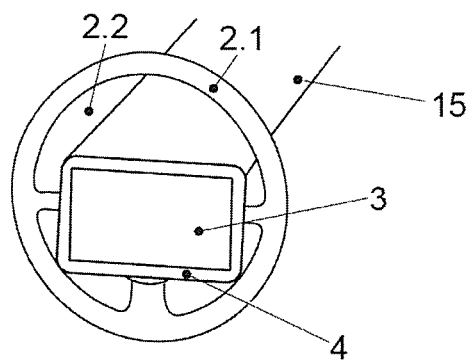
FIGS. 4b and 4c show an illustration of the different positions of the component of the infotainment system during the first exemplary embodiment of the method from a perspective front view.
Figure 4C:
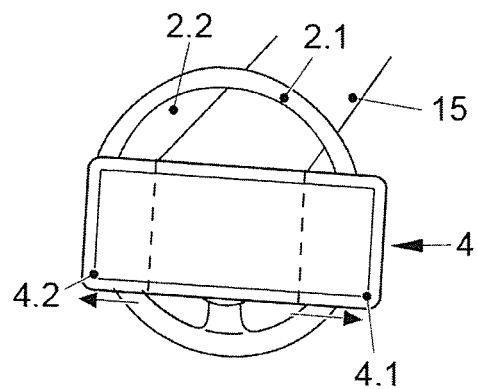

In addition, the apparatus 1 comprises a movement unit 15. This unit is shown in FIGS. 4b and 4c. In this case, the movement unit 15 is in a form such that it can move the touch screen 4 through the opening 2.2 in the steering wheel 2. The movement unit 15 may in this case be a retractable and extendable arm on which the touch screen 4 is mounted. In this case, the dimensions of the touch screen 4 are chosen such that the touch screen 4 fits through the opening 2.2.

Figure 3:
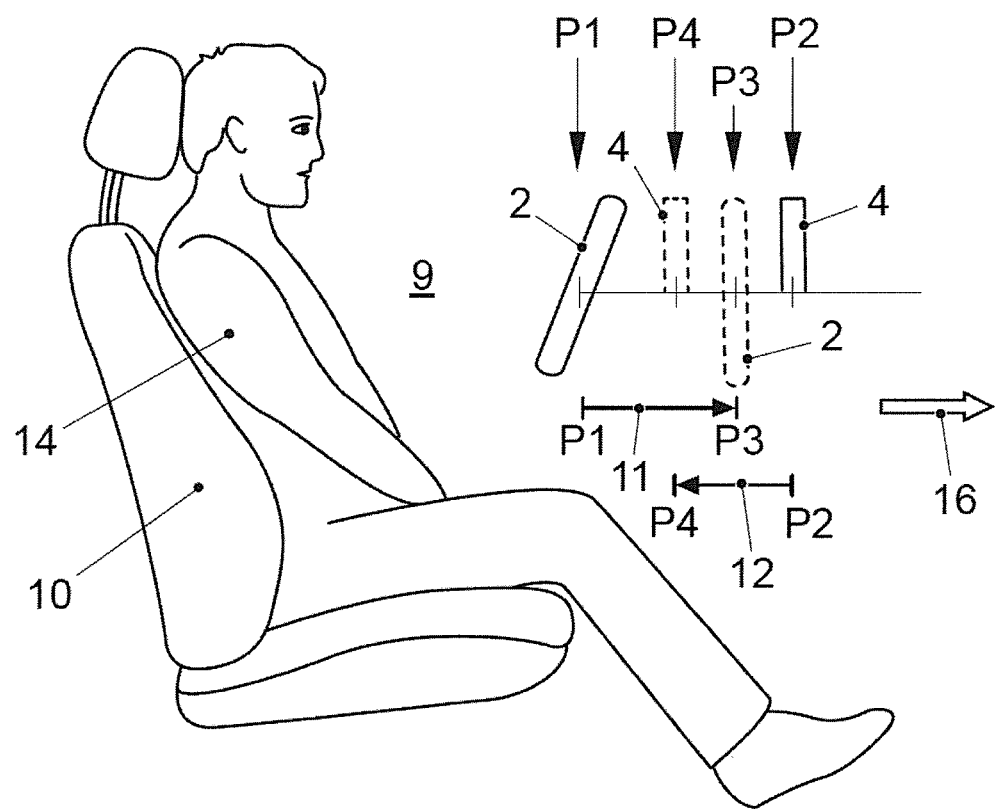
FIG. 3 shows an illustration of the different positions of the components of the apparatus from FIG. 1 in a side view during the first exemplary embodiment of the method.

With reference to FIGS. 2, 3, 4a, 4b and 4c, a first exemplary embodiment of the method is explained. The starting situation in this case is that the driver 14 is operating the vehicle in a first travel mode, that is to say is driving the vehicle himself. FIG. 3 is enclosed merely for the purpose of illustrating the different positions, the intervals not being to scale. In addition, solid lines indicate positions before an alteration of position and broken lines indicate positions after an alteration of position.

In step 21 of the method 20, the driver 14 changes over from the first travel mode to the second travel mode.

In step 22, the ascertainment unit ascertains that the vehicle is in the second travel mode.

In step 23, it is ascertained that the steering wheel 2 is in the first position P1 in the interior 9 of the vehicle. At the same time, it is ascertained that the touch screen 4 is in the second position P2 in the interior 9 of the vehicle. In this case, the second position P2 is in front of the steering wheel 2 relative to the direction of travel 16. From the line of vision of the driver 14, this means that the touch screen 4 is arranged behind the steering wheel 2. This is shown in FIG. 4a from the line of vision of the driver 14.

In step 24, a signal is transmitted to the control unit. This prompts the steering wheel 2 to be first of all shifted forward in the direction of the windshield of the vehicle relative to the direction of travel 16, specifically to the third position P3. This is illustrated by the arrow 11 in FIG. 3. In this case, the third position P3 is particularly the foremost maximum position to which the steering wheel 2 can be shifted. This results in there being more space available between the steering wheel 2 and the driver 14 than before the alteration of position.

In step 25, the touch screen 4, as shown by the arrow 12 in FIG. 3, is shifted from the second position P2 in front of the steering wheel 2, relative to the direction of travel, in the combination instrument 5 through the opening 2.2 to a fourth position P4 in the interior 9 of the vehicle behind the steering wheel 2 relative to the direction of travel. This becomes clear particularly from FIG. 4b. From the point of view of the driver 14, the touch screen 4 is accordingly in front of the steering wheel 2. As a result, the driver 14 can comfortably view display contents on the touch screen 4. In addition, the touch screen 4 is arranged within manual reach of the driver 14. The driver 14 can thus also comfortably perform operator control using the touch screen 4.

After the touch screen 4 has reached the fourth position P4, additional modules 4.1 and 4.2 are extended laterally at the sides of the touch screen 4 in step 26. This is shown in FIG. 4c. The additional modules 4.1 and 4.2 may also be in touch-sensitive form in this case. This significantly increases the display area and also the operator control area of the touch screen 4. The driver 14 can now comfortably use the touch screen 4, which is now arranged in front of the steering wheel 2 from the line of vision of the driver, to write e-mails, watch films, surf the internet and perform similar actions.

The method 20 can be terminated at this point. This is indicated by the dashed line in FIG. 2.

However, if the driver 14 switches from the second travel mode back to the first travel mode, the method 20 can also proceed in reverse order. This is explained with reference to steps 27 to 31 with reference to FIG. 2.

Thus, in step 27 of the method 20, the driver 14 switches from the second travel mode back to the first travel mode.

In step 28, it is ascertained that the vehicle is in the first travel mode.

The ascertainment unit then in turn ascertains the positions, in the interior 9 of the vehicle, of the steering wheel 2 and the touch screen 4. In this case, the first position in the interior 9 of the vehicle corresponds to position P3. The second position in the interior 9 of the vehicle corresponds to position P4.

In step 29, the additional modules 4.1 and 4.2 are first of all retracted behind the touch screen 4 relative to the direction of travel back to their position prior to being extended.

In step 30, the touch screen 4 is returned from position P4 to position P2 in the combination instrument 5 of the vehicle through the opening 2.2 in the steering wheel 2.

In step 31, the steering wheel 2 is returned from position P3 back to its initial position P1. The driver 14 thus does not need to make any additional adjustments to the steering wheel 2, since it readopts the setting preferred by the driver 14.

After step 31, the method 20 is terminated.

In a second exemplary embodiment of the apparatus 1, which generally corresponds to the first exemplary embodiment of the apparatus 1, the apparatus 1 additionally comprises the driver's seat 10. The position of the driver's seat 10 also needs to be able to be matched to anatomies of different drivers 14. Like the steering wheel 2, the driver's seat 10 can also adopt a front and a rear position relative to the direction of travel 16. In this case, however, the front position is the position that the driver sets for his feet to reach the clutch, the gas pedal and the brake pedal in the first travel mode to be able to drive the vehicle. The rear position is a position in which the driver 14 gains legroom in the second travel mode in comparison with the front position. This allows the driver 14 to adopt a comfortable seat position in the second travel mode.

In addition, the ascertainment unit can then additionally ascertain a fifth position and a sixth position in the interior 9 of the vehicle, which position is occupied by the driver's seat 10. The fifth position P5 corresponds particularly to the front position and the sixth position P6 corresponds to the rear position.

Furthermore, the apparatus 1 additionally comprises a sensing unit that can be used to sense an operator control intention of the driver 14.

Figure 5:
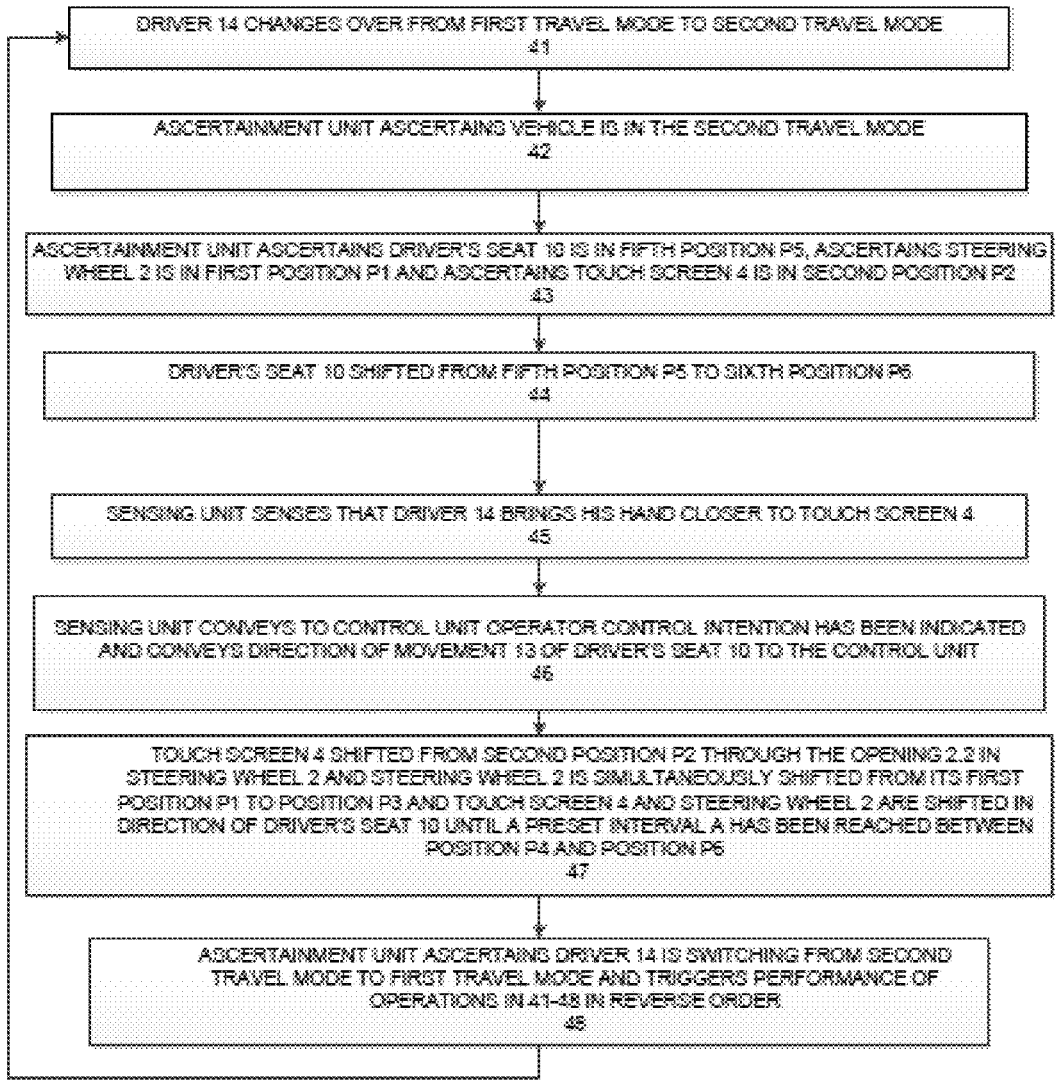
FIG. 5 shows a flowchart for a second exemplary embodiment of the method.
Figure 6:
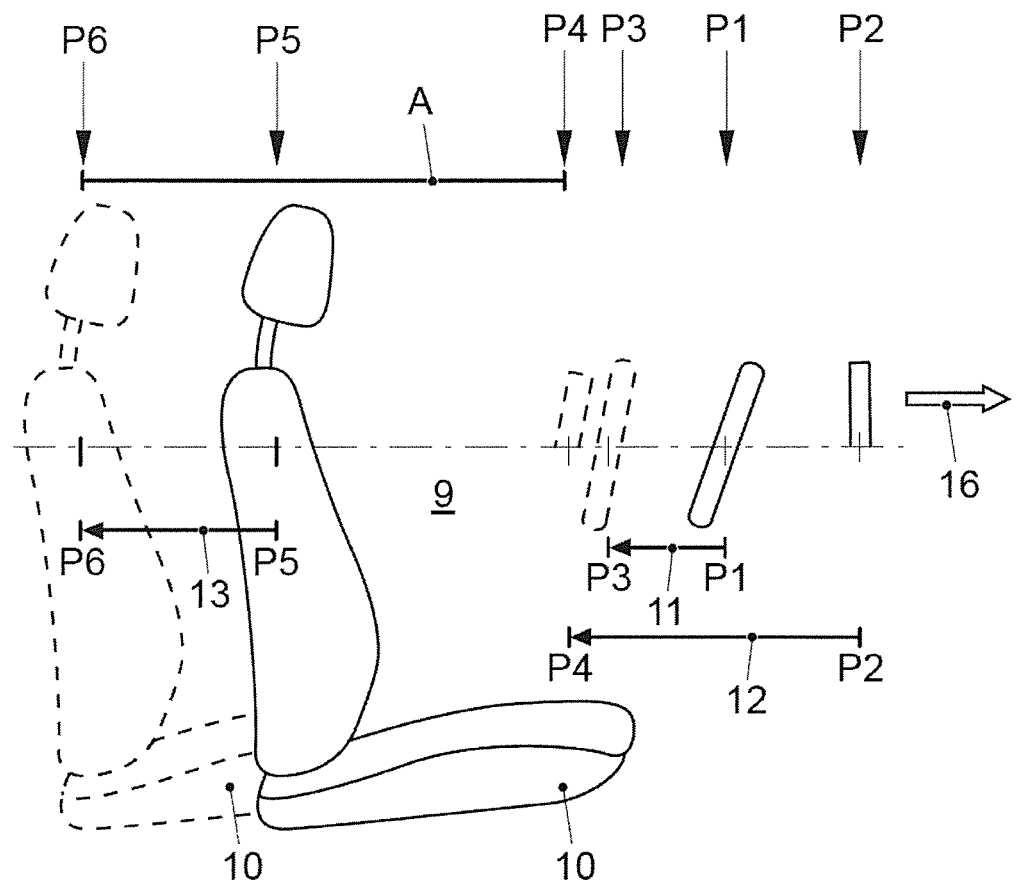
FIG. 6 shows an illustration of the different positions of the components of a second exemplary embodiment of the apparatus from a side view during the second exemplary embodiment of the method.

With reference to FIGS. 5 and 6, a second exemplary embodiment of the method is explained. In FIG. 5, solid lines indicate positions before an alteration of position and broken lines indicate positions after an alteration of position. For reasons of clarity, the driver 14 is no longer shown.

In this case, steps 41 and 42 of the method 40 correspond to steps 21 and 22 of the method 20.

In step 43, it is first of all ascertained that the driver's seat 10 is in the fifth position P5 in the interior 9 of the vehicle. Furthermore, it is ascertained that the steering wheel 2 is in the first position P1 in the interior 9 of the vehicle. At the same time, it is ascertained that the touch screen 4 is in the second position P2 in the interior 9 of the vehicle.

In step 44, the driver's seat 10 is shifted from the fifth position P5 in the direction of the rear window of the vehicle to the sixth position P6 in the interior 9 of the vehicle. The direction of movement in this case is illustrated by the arrow 13. In this case, the sixth position P6 can be determined by a preset from the driver 14. The sixth position P6 is a position of the driver's seat 10 in which the driver 14 can adopt a comfortable seat position in the driver's seat 10 when he is not driving the vehicle himself. At the same time, the ascertainment unit ascertains the direction of movement 13 of the driver's seat 10, particularly whether it is shifted forward or backward. To put the driver's seat 10 into the sixth position P6, the driver's seat 10 does not necessarily need to be shifted. It is also merely possible to adjust the position of the backrest of the driver's seat 10.

In step 45, the sensing unit senses that the driver 14 brings his hand closer to the touch screen 4. To indicate an operator control intention, it is sufficient if the driver 14 brings his hand closer to the steering wheel 2.

In step 46, the sensing unit conveys to the control unit that an operator control intention has been indicated. In addition, the ascertainment unit conveys the direction of movement 13 of the driver's seat 10 to the control unit.

In step 47, the touch screen 4 is then first of all shifted back from the second position P2 in the interior 9 of the vehicle through the opening 2.2 in the steering wheel 2. Since the driver's seat 10 is now so far to the rear in the interior 9 of the vehicle that the driver 14 can no longer reach the touch screen 4 with his hand without altering his seat position, however, the touch screen 4 is shifted further in the direction of the driver's seat 10. This is illustrated by the arrow 12 in FIG. 6. To lend robustness to the touch screen 4, the steering wheel 2 is simultaneously shifted from its first position P1 likewise in the direction of the driver's seat 10 to position P3. This is illustrated by the arrow 11 in FIG. 6. The touch screen 4 and the steering wheel 2 are shifted in a direction of the driver's seat 10 until a preset interval A has been reached between position P4 and position P6. The touch screen 4 is then within manual reach of the driver 14 again.

Step 47 corresponds to step 26 of the method 20, in which additional modules 4.1 and 4.2 are extended laterally.

If, in step 48, the ascertainment unit then again ascertains that the driver 14 is switching from the second travel mode to the first travel mode, steps 41 to 48 can proceed in reverse order until the driver's seat 10, the steering wheel 2 and the touch screen 4 have adopted their initial positions P5, P1 and P2 again.

In this case, the expansion of the display and/or operator control area of the touch screen 4 in steps 26 of the method 20 and 47 of the method 40 can take place in different ways. Thus, the additional modules 4.1 and 4.2 may be arranged in the first position P2 in front of the touch screen 4 relative to the direction of travel 16. In position P4, the modules 4.1 and 4.2 are then extended laterally, upward and/or downward mechanically at the side of the touch screen 4.

Alternatively, the additional modules 4.1 and 4.2 may also be flexible modules. They can then be stored in an extremely space-saving manner in rolled-up or folded form directly at the two sides of the touch screen 4. When needed, the flexible modules can then be unrolled or unfolded manually by the driver or automatically.

A further alternative is dockable modules. These can be plugged onto the sides of the touch screen 4 by the driver 14. Dockable modules have the advantage that they can be stored separately from the touch screen 4 in the vehicle. This allows installation space to be saved.

The touch screen 4 may likewise be arranged in the central console 8 of the vehicle. There is then no need for it to be passed through the steering wheel 2. The touch screen 4 is then shifted from the central console 8 in the direction of the driver. Position 4 can then likewise be behind the steering wheel 2 relative to the direction of travel.

The various steps of the method 20 and 40 can be combined with one another as desired. Thus, in method 20, alteration of the positions of the components can be initiated only when an operator control intention from the driver has been sensed.

The operator control of vehicle functions by the driver while driving is rendered possible today particularly by means of multifunctional steering wheels. These have operator control elements, which means that the driver can operate the infotainment system without taking his attention from the traffic on the road, and particularly his hands from the steering wheel. In future, however, vehicles will be capable of undertaking transverse and longitudinal guidance independently under certain conditions. Constant monitoring of the vehicle driving by the driver is then no longer necessary. During the journey, the driver then has time to perform other activities. In this case, the display of expanded display contents on a display area of the infotainment system is possible without any problems. In a travel mode in which the vehicle is being driven automatically, additional functions cannot be operated using the multifunctional steering wheel. This is possible only by an additional operator control unit, which is usually arranged in the central console of the vehicle.

EP 1 637 387 A1 describes a display apparatus for a vehicle having a highly flexible display for presenting data from applications for a vehicle user. The display can be taken from one position to another position.

In addition, DE 10 2005 003 071 B3 describes a display device for a vehicle having a first and a second partial display area. During travel, the display apparatus is extended only for the first partial display area. During a rest phase, the display apparatus is extended such that the first and second partial display areas are visible.

LIST OF REFERENCE SYMBOLS

1 Apparatus
2 Steering wheel
3 Operator control unit; touch-sensitive surface
4 Display unit; touch screen
4.1 Additional module
4.2 Additional module
5 Combination instrument
8 Central console
9 Interior of the vehicle
10 Driver's seat
11 Steering wheel direction of movement
12 Touch screen direction of movement
13 Driver's seat direction of movement
14 Driver
15 Movement unit
16 Direction of travel
P1-P6 First position to sixth position in the interior of the vehicle
A Interval between driver's seat in the sixth position and touch screen in the fourth position
20, 40 Methods
21-31 Method steps
41-48 Method steps

The invention claimed is:

1. A method for altering a position of a touch screen of an in-vehicle infotainment system in a vehicle interior with a person in a driver seat of the vehicle interior, the method comprising:
ascertaining a travel mode of the vehicle of a plurality of travel modes comprising a first travel mode and a second travel mode, wherein the first travel mode involves the vehicle being driven by the person in the driver seat and the second travel mode involves the vehicle not being driven by the person in the driver seat;
determining, by a control device, that the person switches the travel mode of the vehicle from the first travel mode to the second travel mode;
ascertaining, by the control device, that a steering wheel of the vehicle is in a first position in the vehicle interior;
ascertaining, by the control device, that the touch screen is in a second position, wherein the second position of the touch screen is located in a combination instrument panel of the vehicle interior, wherein the first position of the steering wheel is closer in proximity to the person than the second position of the touch screen; and
in response to ascertainment that the vehicle is in the second travel mode, by the control device, moving the steering wheel from the first position to a third position in the vehicle interior, moving the touch screen with a movement device from the second position to a fourth position in the vehicle interior through an opening in the steering wheel such that the fourth position of the touch screen is moved closer in proximity to the person than the third position of the steering wheel,
wherein, in response to the touch screen being moved to the fourth position through the opening of the steering wheel, a size of the touch screen is altered by the control device such that the touch screen at the fourth position is within a manual reach of the person in the driver seat without a need of reaching the steering wheel which is at the third position behind the touch screen and is out of reach from the person in the second travel mode.

2. The method of claim 1, further comprising:
moving a second vehicle component from a fifth position to a sixth position in the vehicle interior when the vehicle is in the second travel mode; and
ascertaining a direction of movement of the second vehicle component,
wherein a direction of movement of the touch screen is dependent on the ascertained direction of movement of the second vehicle component.

3. The method of claim 2, wherein the second vehicle component is the driver seat which is movable between a rear position and a front position, wherein the fifth position is the driver seat front position and the sixth position is the driver seat rear position.

4. The method of claim 3 further comprising tracking the movement of the touch screen to the movement of the driver seat until the fourth position of the touch screen and the sixth position of the driver seat maintain a preset distance between the fourth position of the touch screen and the sixth position of the driver seat such that the touch screen is within manual reach of the person in the driver seat.

5. The method of claim 1, wherein, the size alteration of the touch screen is implemented by laterally extending additional modules on at least one side of the touch screen so as to provide an expanded operating space that is within a manual reach of the person in the driver seat without a need of reaching the steering wheel which is positioned behind the touch screen and is out of reach of the person in the second travel mode.

6. A system for altering a position of a touch screen of an in-vehicle infotainment system in a vehicle interior with a person in a driver seat of the vehicle interior, the system comprising:
a steering wheel movable from a first position to a third position in the vehicle interior;
a movement device that moves the touch screen from a second position to a fourth position in the vehicle interior in response to a signal indicating that the vehicle has been controlled to change from a first travel mode to a second travel mode, wherein the first travel mode involves the vehicle being driven by the person in the driver seat and the second travel mode involves the vehicle not being driven by the person in the driver seat; and a control device that moves the steering wheel from the first position to the third position, and actuates the movement device to move the touch screen from the second position to the fourth position, wherein when the touch screen is moved from the second position to the fourth position, the touch screen moves through an opening in the steering wheel such that the touch screen is closer in proximity to the person in the driver seat than the steering wheel when the steering wheel is in the third position, wherein, in response to the touch screen being moved to the fourth position through the opening of the steering wheel, a size of the touch screen is altered by the control device such that the touch screen at the fourth position is within a manual reach of the person in the driver seat without a need of reaching the steering wheel which is at the third position behind the touch screen and is out of reach from the person in the second travel mode.

7. The system of claim 6, wherein the control device moves a second vehicle component from a fifth position to a sixth position in the vehicle interior when the vehicle is in the second travel mode, wherein a direction of movement of the touch screen is dependent on an ascertained direction of movement of the second vehicle component.

8. The system of claim 7, wherein a display area of touch screen, at the fourth position in the vehicle interior expands by additional modules on at least one side.

9. The system of claim 7, wherein the second vehicle component is the driver seat which is movable between a rear position and a front position, wherein the fifth position is the driver seat front position and the sixth position is the driver seat rear position.

10. The system of claim 9, wherein the control device tracks the movement of the touch screen to the movement of the driver seat until the fourth position of the touch screen and the sixth position of the driver seat maintain a preset distance between the fourth position of the touch screen and the sixth position of the driver seat such that the touch screen is within manual reach of the person in the driver seat.

* * * * *